(12) United States Patent
Gargaro et al.

US010956942B2

(10) Patent No.: US 10,956,942 B2
(45) Date of Patent: Mar. 23, 2021

(54) SYNCHRONIZATION OF PLAY OF TARGETED MEDIA CONTENT WITH TIME SLOTS IN RADIO BROADCAST SIGNAL (71) Applicant: International Business Machines Corporation, Armonk, NY (US)

(72) Inventors: Gianluca Gargaro, Rome (IT); Gian Filippo Maniscalco, Rome (IT); Maria Angelini, Rome (IT)

(73) Assignee: International Business Machines Corporation, Armonk, NY (US)

( * ) Notice: Subject to any disclaimer, the term of this patent is extended or adjusted under 35 U.S.C. 154(b) by 341 days.

(21) Appl. No.: 15/839,376

(22) Filed: Dec. 12, 2017

(65) Prior Publication Data
US 2019/0180328 A1   Jun. 13, 2019

(51) Int. Cl.
*G06Q 30/02* (2012.01)
*H04H 20/28* (2008.01)
(Continued)

(52) U.S. Cl.
CPC ......... *G06Q 30/0265* (2013.01); *H04H 20/08* (2013.01); *H04H 20/18* (2013.01);
(Continued)

(58) Field of Classification Search
None
See application file for complete search history.

(56) References Cited

U.S. PATENT DOCUMENTS 7,328,004 B1    2/2008  Wolters et al.
2005/0165942 A1*  7/2005  McDowall ......... H04N 21/4383
                                                   709/231
(Continued)

FOREIGN PATENT DOCUMENTS

CN        103944996 A       7/2014
DE        112013005751      10/2015
(Continued)

OTHER PUBLICATIONS

Wagner et al., "'Its Not the Same'—Differences in the Consumption of Digital and Physical Music," ECIS 2013 Completed Research 51, Jul. 1, 2013 (Year: 2013).*

(Continued)

*Primary Examiner* — Christopher B Tokarczyk
(74) *Attorney, Agent, or Firm* — North Shore Patents, P.C.; Michele Liu Baillie (57) ABSTRACT

A radio receiver of an audio system receives a radio signal that includes a main signal and a radio data system (RDS) signal. The RDS signal includes custom information associated with media content tags and synchronized with time slots in the main signal. A media streaming service identifies targeted media content based on a profile of a mobile device connected to the audio system and sends the targeted media content to the mobile device over an Internet connection. During a playing of the audio broadcast, the audio system receives a custom information in the RDS signal and sends to the mobile device a request including the media content tag associated with the custom information. In response, the audio system receives from the mobile device a targeted media content matching the media content tag. The audio system plays the targeted media content synchronized with the time slot in the main signal.

25 Claims, 7 Drawing Sheets

(51) Int. Cl.
*H04H 40/09* (2008.01)
*H04H 20/08* (2008.01)
*H04W 4/21* (2018.01)
*H04H 20/18* (2008.01)
*G01S 19/03* (2010.01)
*H04W 4/38* (2018.01)
*H04W 4/60* (2018.01)
*H04W 4/80* (2018.01)

(52) U.S. Cl.
CPC ............ *H04H 20/28* (2013.01); *H04H 40/09* (2013.01); *H04W 4/21* (2018.02); *G01S 19/03* (2013.01); *H04H 2201/13* (2013.01); *H04H 2201/40* (2013.01); *H04H 2201/70* (2013.01); *H04W 4/38* (2018.02); *H04W 4/60* (2018.02); *H04W 4/80* (2018.02)

(56) References Cited

U.S. PATENT DOCUMENTS

| | | | |
|---|---|---|---|
| 2010/0023393 A1 | 1/2010 | Costy et al. | |
| 2012/0051543 A1* | 3/2012 | Evans | H04H 20/106 380/270 |
| 2013/0006769 A1 | 1/2013 | Schalk et al. | |
| 2014/0164611 A1* | 6/2014 | Molettiere | A61B 5/1112 709/224 |
| 2015/0193516 A1* | 7/2015 | Harb | G06F 16/60 707/625 |
| 2015/0199968 A1 | 7/2015 | Singhal et al. | |
| 2015/0302480 A1 | 10/2015 | Smereka et al. | |
| 2016/0295622 A1* | 10/2016 | Huang | H04W 12/06 |
| 2017/0257742 A1* | 9/2017 | Mihaly | H04W 4/023 |
| 2019/0281097 A1* | 9/2019 | Lundholm | H04N 21/8352 |

FOREIGN PATENT DOCUMENTS

| | | | | |
|---|---|---|---|---|
| EP | 1321880 A2 | 6/2003 | | |
| EP | 1312066 B1 | 6/2004 | | |
| WO | 2007050137 A1 | 5/2007 | | |
| WO | WO-2013064819 A1 * | 5/2013 | ............ | G06F 16/43 |
| WO | 2014105184 A1 | 7/2014 | | |

OTHER PUBLICATIONS

Sachs, E.; "Ads in Cars—Future of Digital Marketing"; https://sachsmarketinggroup.com/ads-in-cars-future-digital-marketing; Nov. 2016.

* cited by examiner

SYNCHRONIZATION OF PLAY OF TARGETED MEDIA CONTENT WITH TIME SLOTS IN RADIO BROADCAST SIGNAL

BACKGROUND

The present invention relates to targeted media content delivery, and more specifically, to the synchronization of targeted media content delivery with a radio broadcast signal.

The evolution of the Internet and mobile devices have lead many traditional radio broadcast systems to offer their own mobile device application for online streaming and on-demand services. However, for vehicles, such as automobiles, trains, and buses, the main type of audio and visual output system available is still terrestrial and satellite radio broadcasting systems which transmit media content through unidirectional radio signals.

Unidirectional radio broadcasting will continue to offer a number of important advantages for vehicle audio systems. First, terrestrial and satellite radio broadcasting offer ubiquitous coverage compared to cellular networks which often have patchy coverage in rural areas. Second, unidirectional radio broadcasting does not add to the network capacity concerns about cellular and other wireless networks becoming more congested as multimedia streaming becomes more widely adopted. Third, online streaming over the Internet includes a cost for the end user in terms of traffic data and mobile device power autonomy.

Commercial radio broadcast systems often rely on their ability to deliver media content to listeners to generate income. Many such commercial radio broadcast systems offer specific time slots during their main programming to customers, during which the customer's media content would be delivered to the listeners. When media content is delivered using cellular or other wireless networks, such media content can be targeted to specific listeners or groups or listeners using profile information gathered from the listener mobile devices. However, the unidirectional nature of radio broadcasting lacks the ability to offer a "feedback loop" where profile information can be gathered for use in identifying targeted media content. Further, even if such targeted media content can be provided to listeners through a different channel, the radio broadcast system is not able to synchronize the play of such media content with a specific time slot during their main programming. Thus, the radio broadcasting systems deliver the same media content to all listeners.

SUMMARY

Disclosed herein is a method for synchronizing a play of a targeted media content with a time slot in a radio broadcast signal, and a computer program product and system as specified in the independent claims. Embodiments of the present invention are given in the dependent claims. Embodiments of the present invention can be freely combined with each other if they are not mutually exclusive.

According to an embodiment of the present invention, a radio receiver of an audio system receives a radio signal from a radio broadcast system. The radio signal includes a main signal and a radio data system (RDS) signal. The RDS signal includes one or more custom information associated with one or more media content tags, and each custom information is synchronized with a pre-determined time slot in the main signal. During a playing of an audio broadcast in the main signal, the audio system receives a given custom information in the RDS signal. The given custom information synchronized with a given pre-determined time slot in the main signal. In response to the given custom information, the audio system sends to a mobile device connected to the audio system a request comprising a given media content tag associated with the given custom information. The audio system receives from the mobile device, as response to the request, a targeted media content associated with a content identifier matching the given media content tag. The audio system plays the targeted media content, where the playing of the targeted media content is synchronized with the given pre-determined time slot in the main signal. This embodiment of the present invention solves the problem of synchronizing the playing of the targeted media content with pre-determined time slots in the main signal of the radio signal. This allows a radio broadcast system to offer targeted media content to be played at specific time slots during its radio broadcast.

In one aspect of the present invention, the mobile device is a primary mobile device. The media streaming service server collects global positioning system (GPS) data from a plurality of mobile devices over time. The media streaming service server identifies one or more common patterns in the GPS data that indicate a group of mobile devices traveling with the primary mobile device. The media streaming service server obtains profiles for the group of mobile devices. The media streaming service server identifies the targeted media content for the group of mobile devices based on the profiles, where the targeted media content is associated with the content identifier. The media streaming service server sends the targeted media content and the content identifier to the primary mobile device over an Internet connection.

In one aspect of the present invention, the media streaming service server determines that the GPS data does not meet a pre-determined accuracy threshold. The media streaming service server sends a request to the primary mobile device for proximity data. The media streaming service server receives the proximity data for a list of mobile devices from the primary mobile device. The media streaming service server revises the group of mobile devices based on the proximity data.

In one aspect of the present invention, in response to receiving the request for the proximity data from the media streaming service server, the primary mobile device identifies the list of mobile devices in proximity to the primary mobile device using a Bluetooth proximity discovery process. The primary mobile device sends the proximity data for the list of mobile devices to the media streaming service server.

In one aspect of the present invention, the media streaming service server determines that an Internet connection with the primary mobile device has fallen below a pre-determined threshold. The media streaming service server searches for an alternate mobile device in the group of mobile devices with an Internet connection above the pre-determined threshold. The media streaming service server sends the targeted media content and the content identifier to the alternate mobile device over the Internet connection with the alternate mobile device.

In one aspect of the present invention, the alternative mobile device receives the targeted media content and the content identifier from the media streaming service server. In response, the alternative mobile device establishes a connection with the audio system.

In a second embodiment of the present invention, a radio receiver of an audio system receives a radio signal from a radio broadcast system. The radio signal includes a main signal and a radio data system (RDS) signal. The RDS signal includes one or more custom information associated with one or more media content tags. Each custom information synchronized with a pre-determined time slot in the main signal. A media streaming service server obtains a profile of a mobile device over an Internet connection, the mobile device being connected to the audio system. The media streaming service server identifies the targeted media content based on the profile, where the targeted media content is associated with the content identifier. The media streaming service server sends the targeted media content and the content identifier to the mobile device over the Internet connection. During a playing of an audio broadcast in the main signal, the audio system receives a given custom information in the RDS signal, where the given custom information is synchronized with a given pre-determined time slot in the main signal. In response to the given custom information, the audio system sends a request including a given media content tag associated with the given custom information to the mobile device. The audio system receives from the mobile device, as response to the request, a targeted media content associated with a content identifier matching the given media content tag. The audio system plays the targeted media content, where the playing of the targeted media content is synchronized with the given pre-determined time slot in the main signal In a third embodiment of the present invention, a radio receiver of an audio system receives a radio signal from a radio broadcast system. The radio signal includes a main signal and a radio data system (RDS) signal. The RDS signal includes one or more custom information associated with one or more media content tags. Each custom information is synchronized with a pre-determined time slot in the main signal. A media streaming service server collects global positioning system (GPS) data from a plurality of mobile devices over time. The media streaming service server identifies one or more common patterns in the GPS data that indicate a group of mobile devices traveling with a primary mobile device connected to the audio system. The media streaming service server obtains profiles for the group of mobile devices. The media streaming service server identifies the targeted media content for the group of mobile devices based on the profiles, where the targeted media content is associated with the content identifier. The media streaming service server sends the targeted media content and the content identifier to the primary mobile device over an Internet connection. During a playing of an audio broadcast in the main signal, the audio system receives a given custom information in the RDS signal, where the given custom information is synchronized with a given pre-determined time slot in the main signal. In response to the given custom information, the audio system sends to the primary mobile device a request comprising a given media content tag associated with the given custom information. The audio system receives from the primary mobile device a targeted media content associated with a content identifier matching the given media content tag. The audio system plays the targeted media content, where the playing of the targeted media content is synchronized with the given pre-determined time slot in the main signal.

DETAILED DESCRIPTION

Figure 1:
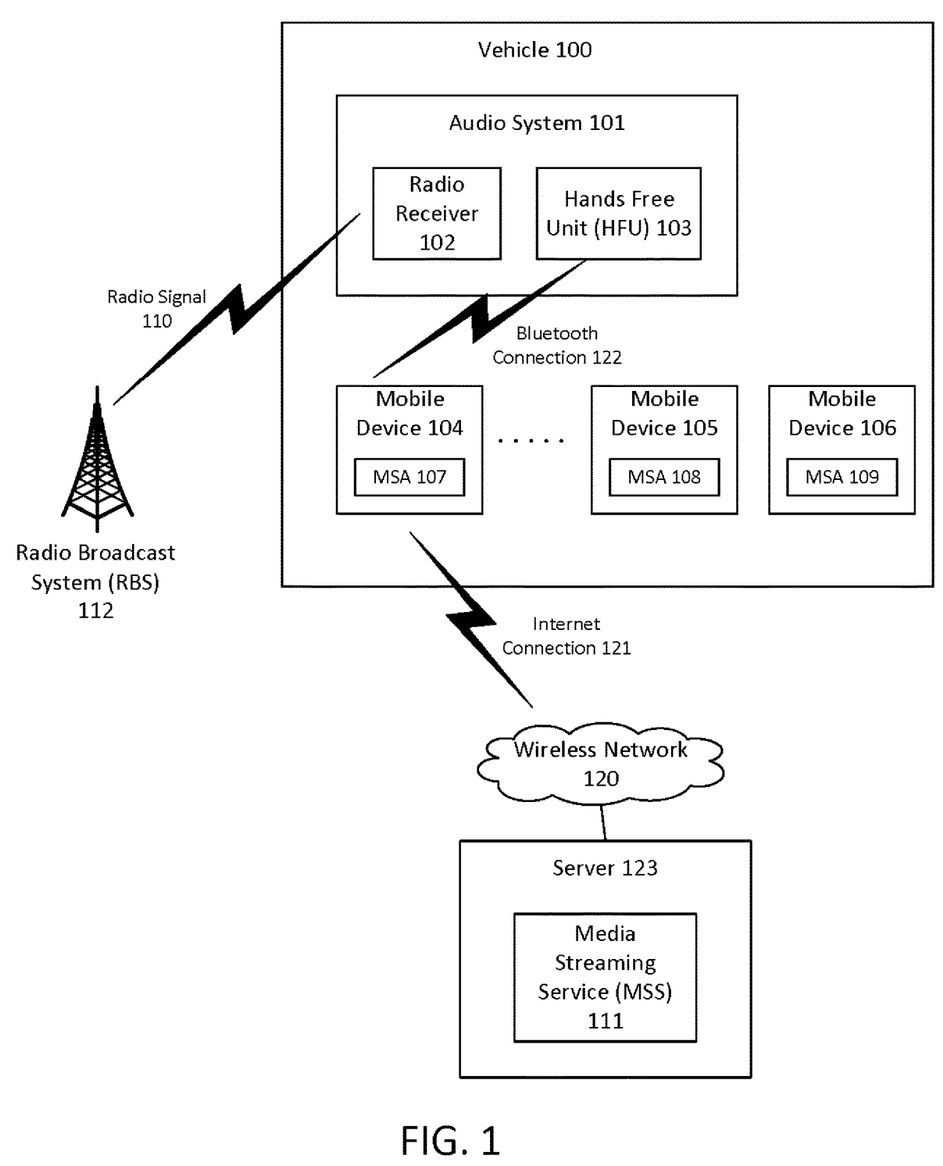
FIG. 1 illustrates a system for targeted media content delivery synchronized with radio broadcast signals, according to an exemplary embodiment of the present invention.

FIG. 1 illustrates a system for targeted media content delivery synchronized with radio broadcast signals, according to an exemplary embodiment of the present invention. The system includes a plurality of mobile devices 104-106 residing within a vehicle 100. The vehicle 100 includes an audio system 101 comprising a radio receiver 102 and a hands-free unit (HFU) 103. The radio receiver 102 receives radio signals 110 from radio broadcast systems (RBS) 112, and the audio system 101 plays the audio programming contained in the radio signal 110. The mobile devices 104-106 include capabilities for connecting to a wireless network 120. The wireless network 120 may be any network over which the mobile devices 104-106 have Internet connections 121, such as cellular networks or WiFi networks. The HFU 103 includes a Bluetooth Hands-Free profile for connecting, wirelessly, with a mobile device 104 for the purpose of acting as the mobile device's audio input and output mechanism. When connected to the HFU 103 over a Bluetooth connection 122, the mobile device 104 functions as an audio gateway. Each mobile device 104-106 includes a mobile streaming application (MSA) 107-109, which communicates over the Internet connection 121 with a media streaming service (MSS) 111 implemented by one or more computer systems, such as a server 123.

The RBS 112 offers pre-determined time slots during its audio broadcast to customers during which targeted media content can be played. The MSS 111 receives mobile device profile(s) through the MSA 107-109 at the mobile device(s) 104-106 over the Internet connection 121, identifies targeted media content based on the mobile device profile(s), and delivers the targeted media content over the Internet connection 121 to the MSA 107 of the mobile device 104 with the Bluetooth connection 122 with the HFU 103, referred to herein as the primary mobile device. Each targeted media content is associated with a given pre-determined time slot in the audio broadcast. The targeted media content is sent to the MSA 107 prior to the time slot, and the targeted media content is buffered at the primary mobile device 104. The targeted media content is played over the vehicle audio system 101 using the primary mobile device 104 as an audio gateway. In order to properly deliver the targeted media content, the start and stop of the playing of the targeted media content is synchronized with the associated time slot in the audio broadcast.

Figure 2:
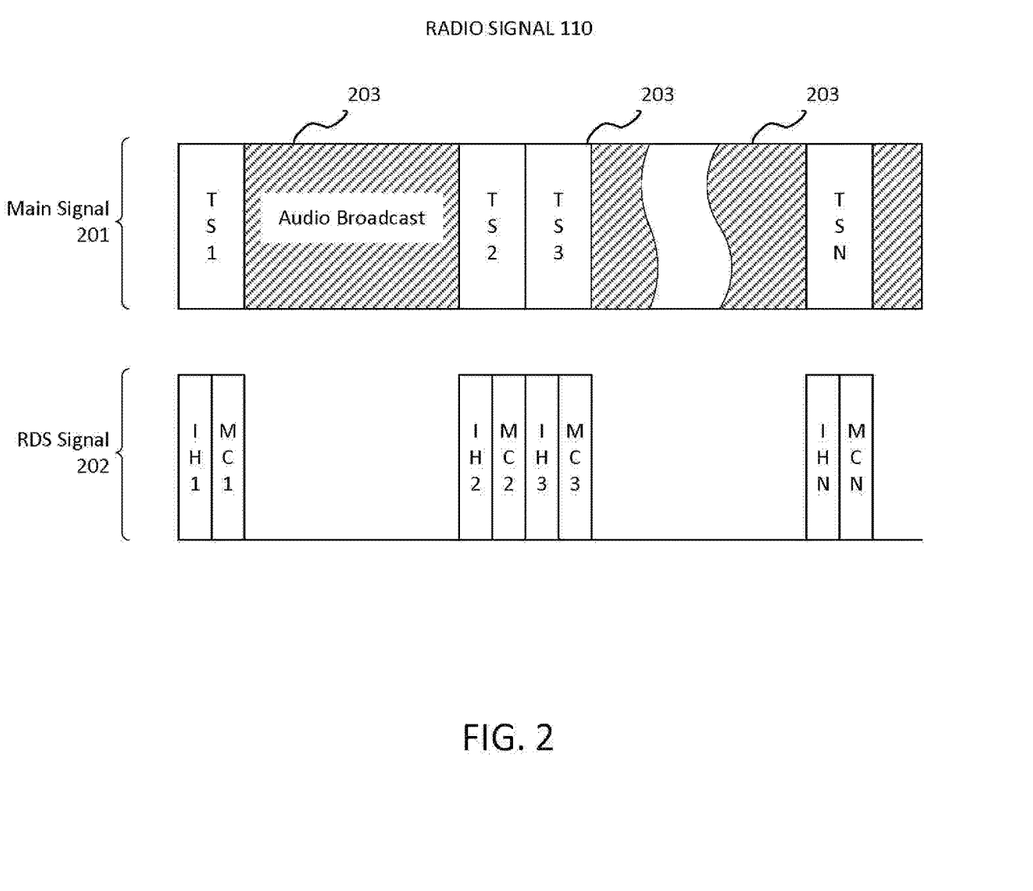
FIG. 2 illustrates a radio signal for synchronization of targeted media content with time slots in the radio broadcast, according to an exemplary embodiment of the present invention.

To synchronize the playing of targeted media content with the associated time slots in the audio broadcast, embodiments of the present invention leverages the radio data system (RDS) signal comprised in the radio signal 110. The RDS signal is a communications protocol standard for embedding small amounts of digital information in radio broadcasts. FIG. 2 illustrates a radio signal for synchronization of targeted media content with time slots in the radio broadcast, according to an exemplary embodiment of the present invention. The radio signal 110 includes at least two parts, the main signal 201 and the RDS signal 202. The main signal 201 includes the audio broadcast 203 with a plurality of pre-determined time slots (TS1-TSN). The RDS signal 202 flows with the main signal 201 and has an internal timing and synchronization feature that can be used to timely send triggering signals. Under the current RDS protocol, the baseband coding structure (i.e., the data-link layer) of the main signal 201 contains a "group" as the largest element, where each group contains four "blocks". Each block contains a data word and a bit checkword. The synchronization of the baseband coding structure in the main signal 201 with the RDS message blocks and groups in the RDS signal 202 is accomplished through the use of an offset table containing an offset word (e.g. A, B, C, C', D, and optionally E). The RDS signal 202, along with its internal time clock, can provide timing accuracy up to 100 milliseconds. Example information that can be transmitted using RDS includes time, station identification, and program information. In addition, the RDS protocol includes an "In-house Application" (IH) message for sending custom information, which when processed by the audio system 101, triggers a precoded activity, e.g. remote switching, testing, internal paging, etc. In this exemplary embodiment, the present invention leverages the In House information (IH), but other mechanisms of the RDS signal can also be used. The IH is generally ignored by the radio receiver 102, and the exemplary embodiments of the present invention use the IH as a triggering signal to the vehicle audio system 101 to perform the functions described herein. As illustrated in FIG. 2, the RDS signal 202 includes a plurality of custom information (IH1-IHN), each associated with a media content tag (MC1-MCN). The custom information (IH1-IHN) in the RDS signal 202 are synchronized with the pre-determined time slots (TS1-TSN) in the main signal 201. Each custom information (IH1-IHN) triggers the audio system 101 to fetch, from the primary mobile device 104, the targeted media content associated with a content identifier matching its corresponding media content tag (MC1-MCN), and to play the targeted media content. In combination, these features provide synchronization of the playing of targeted media content with pre-determined time slots in the main signal 201, as described further below with reference to FIGS. 3-4.

Figure 3:
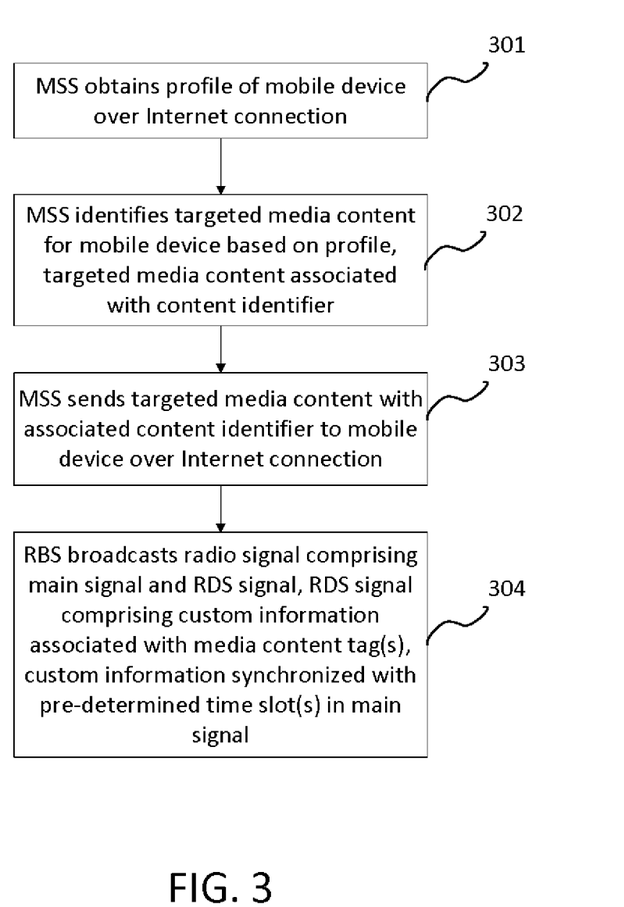
FIG. 3 illustrates a method for delivering targeted media content according to an exemplary embodiment of the present invention.

FIG. 3 illustrates a method for delivering targeted media content according to an exemplary embodiment of the present invention. In the exemplary embodiment, the mobile device 104 is paired with the HFU 103 over a Bluetooth connection 122. The MSA 107 at the mobile device 104 subscribes to the MSS 111, and the mobile device 104 functions as a targeted media content collector and controller. The MSS 111 obtains the profile of the mobile device 104 over the Internet connection 121 (301). The MSS 111 identifies a targeted media content for the mobile device 104 based on the profile (302), where the targeted media content is associated with a content identifier. The MSS 111 sends the targeted media content with the associated content identifier to the mobile device 104 over the Internet connection 121 (303). The radio broadcast system 112 broadcasts the radio signal 110 comprising the main signal 201 and the RDS signal 202 (304). The RDS signal 202 comprises custom information (IH1-IHN) associated with media content tags (MC1-MCN), where the custom information (IH1-IHN) are synchronized with pre-determined time slots (TS1-TSN) in the main signal 201 (304). The sending of the targeted media content to the mobile device 104 may be performed asynchronously with the custom information (IH1-IHN) in the RDS signal 202. More specifically, the targeted media content is received prior to the processing of the custom information which results in the playing of the targeted media content. Optionally, different targeted media content can be associated with the same content identifier for different mobile devices 104-106. In other words, the MSA's 107-109 and the mobile devices 104-106 may receive different targeted media content from the MSS 111 but associated with the same content identifier. The content identifier thus distinguishes between media contents received from the MSS 111 by a given mobile device but not uniquely across all mobile devices 104-106.

Figure 4:
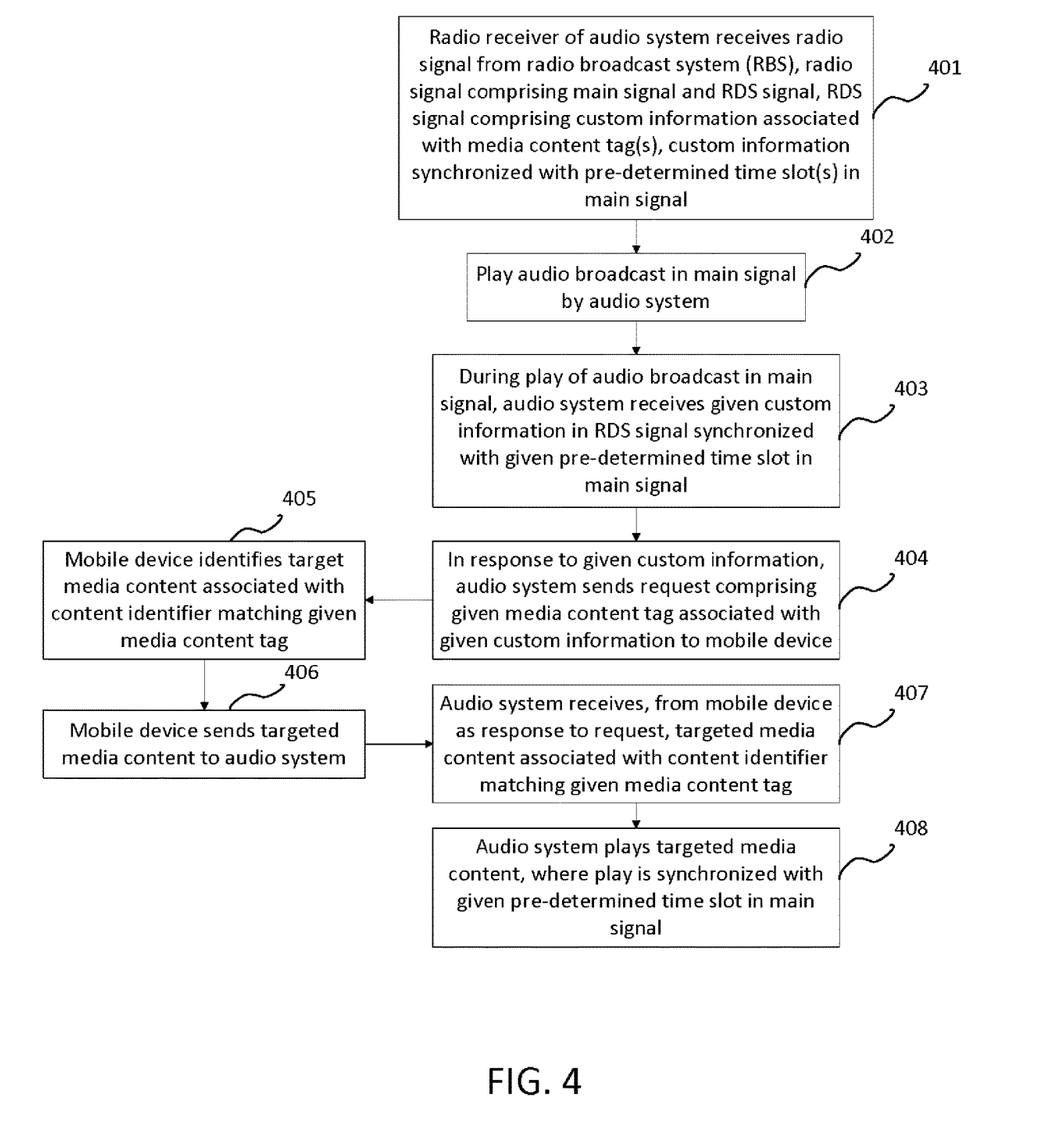
FIG. 4 illustrates a method for synchronizing the play of targeted media content with time slots in a radio broadcast signal, according to an exemplary embodiment of the present invention.

FIG. 4 illustrates a method for synchronizing the play of targeted media content with time slots in a radio broadcast signal, according to an exemplary embodiment of the present invention. In the exemplary embodiment, the radio receiver 102 of the vehicle audio system 101 receives the radio signal 110 from the RBS 112 (401). The radio signal 110 comprises the main signal 201 and the RDS signal 202. The RDS signal 202 comprises custom information (IH1-IHN) associated with media content tags (MC1-MCN). The custom information (IH1-IHN) is synchronized with the pre-determined time slots (TS1-TSN) in the main signal 201. The vehicle audio system 101 plays the audio broadcast 203 contained in the main signal 201 (402). During the playing of the audio broadcast in the main signal 201, the audio system 101 receives a given custom information (IH1) in the RDS signal 202, which is synchronized with a given pre-determined time slot (TS1) in the main signal 201 (403). In response to the given custom information (IH1), the audio system 101 sends a request comprising the given media content tag (MC1) associated with the given custom information (IH1) to the mobile device 104 (404). Optionally, the audio system 101 checks whether a Bluetooth connection exists between the mobile device 104 and the HFU 103. If not, then a Bluetooth connection 122 with the mobile device 104 is first established using known protocols, and the request is then sent over the Bluetooth connection 122. Upon receiving the request, the MSA 107 at the mobile device 104 identifies a targeted media content stored at the mobile device 104 associated with a content identifier that matches the given media content tag (MC1) (405). As a response to the request, the MSA 107 of the mobile device 104 sends the targeted media content to the audio system 101 (406). The audio system 101 receives, from the mobile device 104 as a response to the request, the targeted media content associated with the content identifier matching the given media content tag (MC1) (407). The audio system 101 then plays the targeted media content, where the play is synchronized with the given pre-determined time slot (TS1) in the main signal 201 (408).

In the above described manner, embodiments of the present invention solve the problem of synchronizing the playing of the targeted media content with pre-determined time slots (TS1-TSN) in the main signal 201 of the radio signal 110. This allows RBS 112 to offer targeted media content to be played at specific time slots during its radio broadcast.

Although the embodiments of the present invention are described herein in the context of an audio system in a vehicle, the synchronization of the playing of targeted media content with a radio signal may be applied to audio systems which are not in vehicles and which are capable of connecting to a mobile device such that the mobile device functions as the audio gateway.

In another embodiment of the present invention, instead of playing media content targeted to one given mobile device 104, the media content may be targeted to one or more mobile devices in a group of mobile devices. For example, the vehicle 100 may have multiple passengers, each with a mobile device 104-106. The mobile device 104 paired with the HFU 103 is the primary mobile device 104. By default, the MSS 111 is configured to identify media content targeted at the primary mobile device 104. Optionally, MSS 111 can instead be configured to identify media content targeted to a mobile device in the vehicle 100 other than the primary mobile device 104 or identify media content targeted to the group as a whole. To identify targeted media content for a group of mobile devices, the MSS 111 must first define the mobile devices that belong to the group.

Figure 5:
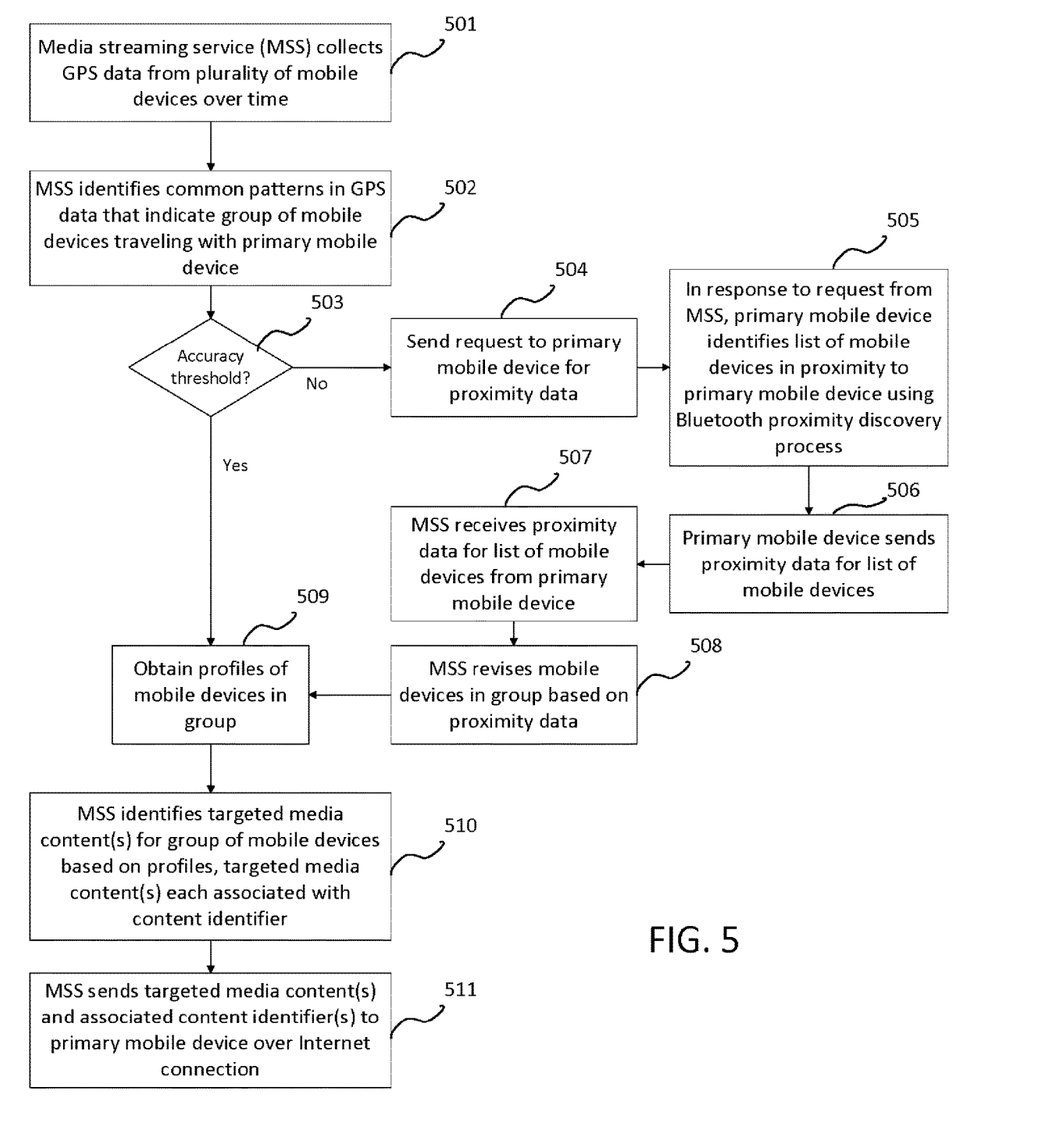
FIG. 5 illustrates a method for identifying a group of mobile devices for the delivery of targeted media content by a media streaming service, according to an exemplary embodiment of the present invention.

FIG. 5 illustrates a method for identifying a group of mobile devices for the delivery of targeted media content by a media streaming service (MSS), according to an exemplary embodiment of the present invention. The MSS 111 collects Global Positioning System (GPS) data from a plurality of mobile devices over time (501). The MSS 111 identifies one or more common patterns in the GPS data that indicate a group of mobile devices traveling with the primary mobile device 104 (502). The identification of common patterns in GPS data that are within a predetermined degree of matching. The degree of matching is a configurable parameter that considers the geography and/or population density of a particular area. For example, when a particular area has a dense population, such as an urban area, a closer degree of matching may be configured than for less densely populated areas. The identification of common patterns is described further below with reference to FIG. 6.

In the above described manner, embodiments of the present invention solve the problem of synchronizing the playing of the media content targeted to a group of mobile devices with pre-determined time slots (TS1-TSN) in the main signal 201 of the radio signal 110. However, in certain situations, the accuracy of the GPS data may not be sufficient to reasonably identify common patterns. For example, two vehicles may be traveling in adjacent lanes on a road, and each vehicle has a group of passengers with mobile devices. The GPS data may indicate a common pattern between the group of mobile devices in the two vehicles, however, the density of vehicles on the road and the limits of accuracy of the GPS signal, may make it difficult to meaningfully determine whether this group of mobile devices are traveling in the same vehicle or are two different groups of mobile devices traveling in two different vehicles. In another embodiment of the present invention, when the common patterns do not meet the accuracy threshold (503), the MSS 111 sends a request to the MSA 107 of the primary mobile device 104 for proximity data (504). In response to the request, the MSA 107 of the primary mobile device 104 activates the Bluetooth proximity discovery process to identify a list of mobile devices in proximity to the primary mobile device 104 (505). The Bluetooth proximity discovery process, as is known in the art, is used to discover other mobile devices with the Bluetooth functionality turned on that are in close proximity. Once discovered, a piconet may be formed with the mobile devices in close proximity. Here, a piconet need not actually be formed from the proximity discovery process. The primary mobile device 104 sends to the MSS 111 the proximity data for the list of mobile devices, collected through the discovery process (506). Upon receiving the proximity data for the list of mobile devices from the primary mobile device 104 (507), the MSS 111 revises the mobile devices in the group based on the proximity data (508). The MSS 111 obtains the profiles of the mobile devices in the group (509) and identifies one or more targeted media contents for the group of mobile devices based on the profiles. The targeted media contents are each associated with a content identifier (510). The MSS 111 sends the targeted media contents, with the associated content identifiers, to the primary mobile device 104 in the group over the Internet connection 121 (511).

Figure 6:
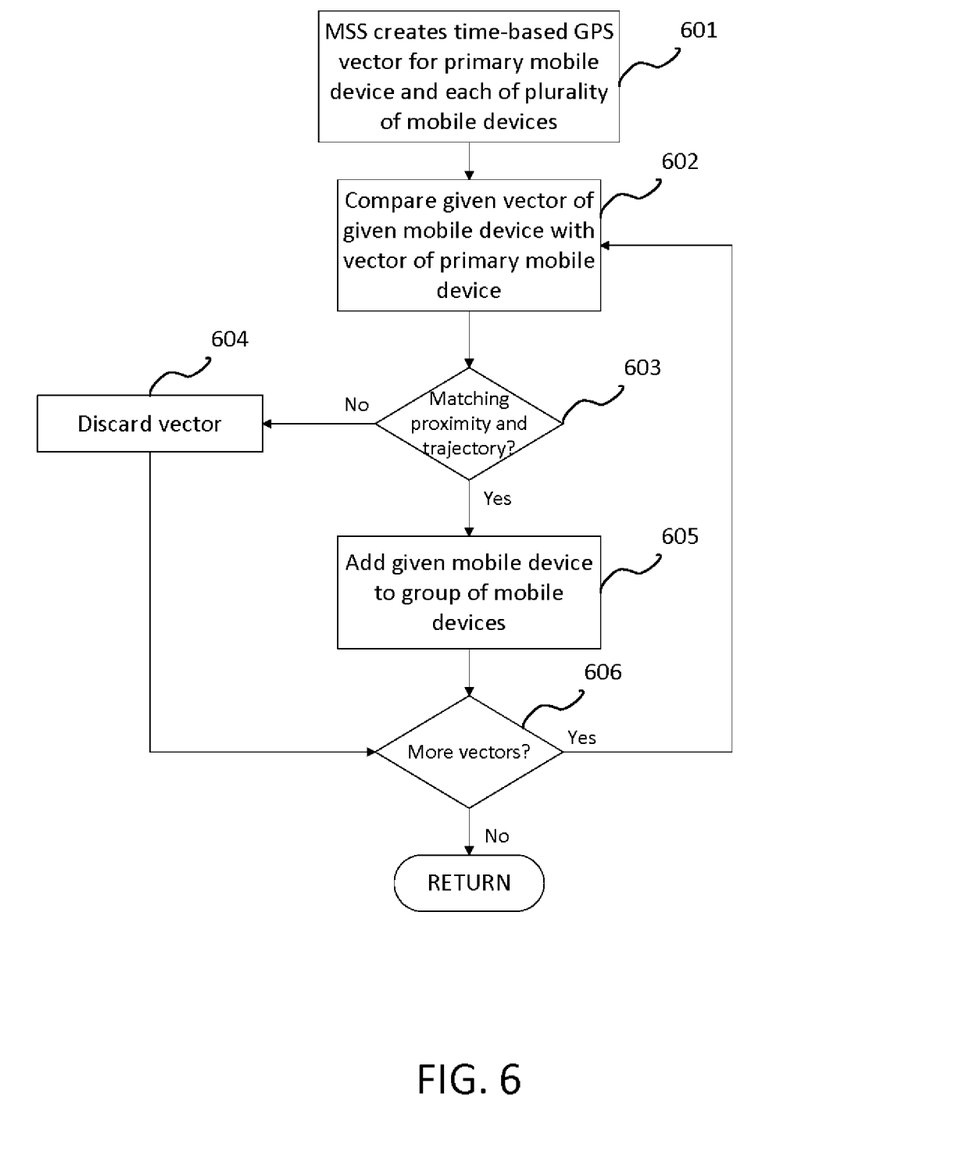
FIG. 6 illustrates in more detail the identification of common patterns in GPS data, according to an exemplary embodiment of the present invention.

FIG. 6 illustrates in more detail the identification of common patterns in GPS data, according to an exemplary embodiment of the present invention. The MSS 111 creates a time-based GPS vector for the primary mobile device 104 and each of the plurality of mobile devices (601) and compares a given vector of a given mobile device of the plurality of mobile devices with the vector of the primary mobile device 104 (602). When the two vectors do not match in proximity and trajectory (603), the vector is discarded (604). When the two vectors match in proximity and trajectory (603), the given mobile device is added to the group of mobile devices (605). When there are more vectors for the plurality of mobile devices to compare, the process defined by 602-605 are repeated (606).

In another embodiment of the present invention, when the quality of the Internet connection 121 between the primary mobile device 104 and the MSS 111 falls below a predetermined threshold, the MSS 111 may automatically, without user intervention, search for an alternate mobile device 105 in the group of mobile devices with the required quality in its Internet connection 121. When such a mobile device is found, the MSS 111 may automatically send the targeted media content to the MSA 108 of the alternate mobile device 105. In response, the MSA 108 of the alternate mobile device 105 may establish a Bluetooth connection with the HFU 103 so that the alternate mobile device 105 becomes the primary mobile device. The targeted media content received by the MSA 108 can then be played synchronized with time slots in the main signal 201 as described above.

Figure 7:
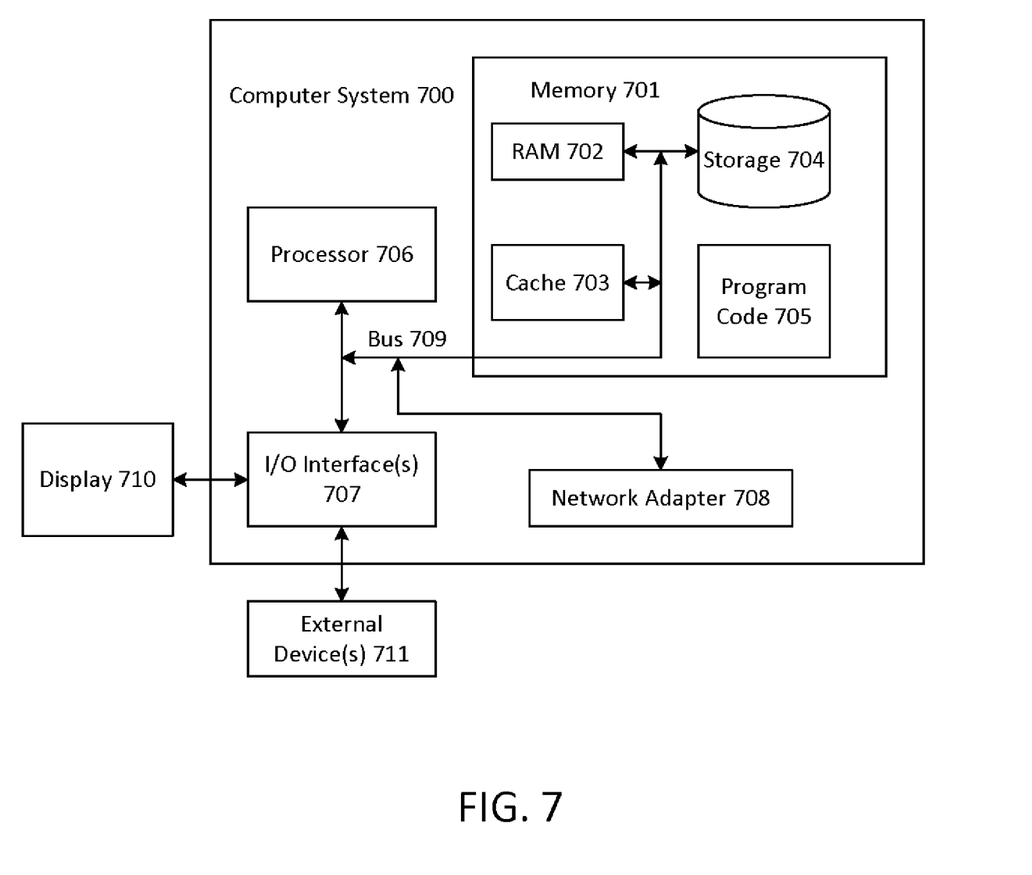
FIG. 7 illustrates a computer system according to exemplary embodiments of the present invention.

FIG. 7 illustrates a computer system according to exemplary embodiments of the present invention. One or more of the computer systems implements the synchronization of the playing of targeted media content with time slots in a radio broadcast signal, according to embodiments of the present invention. The computer system 700 is operationally coupled to a processor or processing units 706, a memory 701, and a bus 709 that couples various system components, including the memory 701 to the processor 706. The bus 709 represents one or more of any of several types of bus structure, including a memory bus or memory controller, a peripheral bus, an accelerated graphics port, and a processor or local bus using any of a variety of bus architectures. The memory 701 may include computer readable media in the form of volatile memory, such as random access memory (RAM) 702 or cache memory 703, or non-volatile storage media 704. The memory 701 may include at least one program product having a set of at least one program code module 705 that are configured to carry out the functions of embodiment of the present invention when executed by the processor 706. The computer system 700 may also communicate with one or more external devices 711, such as a display 710, via I/O interfaces 707. The computer system 700 may communicate with one or more networks via network adapter 708.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for synchronizing a play of a targeted media content with a time slot in a radio broadcast signal comprising:
    receiving, by a radio receiver of an audio system, a radio signal from a radio broadcast system, the radio signal comprising a main signal and a radio data system (RDS) signal, the main signal comprising a plurality of audio programming and one or more pre-determined time slots, the RDS signal comprising one or more custom information corresponding to one or more media content tags, each custom information synchronized with one of the pre-determined time slots in the main signal;
    during a playing of the radio signal, processing, by the audio system, a given custom information of the one or more custom information in the RDS signal, the given custom information synchronized with a given pre-determined time slot of the one or more pre-determined slots in the main signal;
    in response to processing, the given custom information from the RDS signal, sending, by the audio system to a mobile device connected to the audio system, a request comprising a given media content tag of the one more more media content tags corresponding to the given custom information;
    receiving as response to the request, by the audio system from the mobile device, a targeted media content identified by a content indentifier based on matching the given media content tag to the content identifier at the mobile device, the targeted media content and the content identifier being received by the mobile device prior to the processing of the given custom information by the audio system; and
    playing, by the audio system, the targeted media content, wherein the playing of the targeted media content is synchronized with the given pre-determined time slot in the main signal.

2. The method of claim 1, wherein the one or more custom information comprises one or more In-house messages in the RDS signal.

3. The method of claim 1, wherein prior to the receipt of the given custom information in the RDS signal by the audio system, the method further comprises:
    obtaining, by a media streaming service server, a profile of the mobile device over an Internet connection;
    identifying, by the media streaming service server, the targeted media content based on the profile, the targeted media content being associated with the content identifier; and
    sending the targeted media content and the content identifier to the mobile device by the media streaming service server over the Internet connection.

4. The method of claim 1, wherein the mobile device is a primary mobile device, wherein prior to the receipt of the given custom information in the RDS signal by the audio system, the method further comprising:
    collecting, by a media streaming service server, global positioning system (GPS) data from a plurality of mobile devices over time;
    identifying, by the media streaming service server, one or more common patterns in the GPS data that indicate a group of mobile devices traveling with the primary mobile device;
    obtaining, by the media streaming service server, profiles for the group of mobile devices;
    identifying, by the media streaming service server, the targeted media content for the group of mobile devices based on the profiles, the targeted media content associated with the content identifier; and
    sending, by the media streaming service server, the targeted media content and the content identifier to the primary mobile device over an Internet connection.

5. The method of claim 4, further comprising:
    determining, by the media streaming service server, that the GPS data does not meet a pre-determined accuracy threshold;
    sending, by the media streaming service server, a request to the primary mobile device for proximity data;
    receiving, by the media streaming service server, the proximity data for a list of mobile devices from the primary mobile device; and
    revising, by the media streaming service server, the group of mobile devices based on the proximity data.

6. The method of claim 5, further comprising:
    in response to receiving the request for the proximity data from the media streaming service server, identifying, by the primary mobile device, the list of mobile devices in proximity to the primary mobile device using a Bluetooth proximity discovery process; and
    sending, by the primary mobile device, the proximity data for the list of mobile devices to the media streaming service server.

7. The method of claim 4, further comprising:
    determining, by the media streaming service server, that as the Internet connection with the primary mobile device has fallen below a pre-determined threshold;
    searching, by the media streaming service server, for an alternate mobile device in the group of mobile devices with an Internet connection above the predetermined threshold; and
    sending, by the media streaming service server, the targeted media content and the content identifier to the alternate mobile device over the Internet connection with the alternate mobile device.

8. The method of claim 7, further comprising:
    receiving, by the alternative mobile device, the targeted media content and the content identifier from the media streaming service server; and
    in response to the alternative mobile device receiving the targeted media content and the content identifier from the media streaming service server, establishing a connection with the audio system by the alternative mobile device.

9. The method of claim 1, wherein the mobile device is connected to the audio system, wherein prior to receiving the given custom information in the RDS signal by the audio system, the method further comprises:
    identifying, by a media streaming service server, a second mobile device traveling with the mobile device and not connected to the audio system;
    obtaining, by the media streaming service server, a profile for the second mobile device;

identifying, by the media streaming service server, the target media content for the second mobile device based on the profile, the targeted media content associated with the content identifier; and sending, by the media streaming service server, the targeted media content and the content identifier to the mobile device over an Internet connection.

10. A computer program product for synchronizing a play of targeted media content with a time slot in a radio broadcast signal, the computer program product comprising a non-transitory computer readable storage medium having program instructions embodied therewith, the program instructions executable by one or more processors to cause the one or more processors to:

receive, by a radio receiver of an audio system, a radio signal from a radio broadcast system, the radio signal comprising a main signal and a radio data system (RDS) signal, the main signal comprising a plurality of audio programming and one or more pre-determined time slots, the RDS signal comprising one or more custom information corresponding to one or more media content tags, each custom information synchronized with one of the pre-determined time slots in the main signal;

during a playing of the radio signal, process, by the audio system, a given custom information of the one or more custom information in the RDS signal, the given custom information synchronized with a given pre-determined time slot of the one or more pre-determined time slots in the main signal;

in response to processing the given custom information from the RDS signal, send, by the audio system to a mobile device connected to the audio system, a request comprising a given media content tag of the one or more media content tags corresponding to the given custom information;

receive as response to the request, by the audio system from the mobile device, a targeted media content identified by a content identifier based on matching the given media content tag to the content identifier at the mobile device, the targeted media content and the content identifier being received by the mobile device prior to the processing of the given custom information by the audio system; and play, by the audio system, the targeted media content, wherein the playing of the targeted media content is synchronized with the given pre-determined time slot in the main signal.

11. The computer program product of claim 10, wherein prior to the receipt of the given custom information in the RDS signal by the audio system, the one or more processors are further caused to:

obtain, by a media streaming service server, a profile of the mobile device over an Internet connection;

identify, by the media streaming service server, the targeted media content based on the profile, the targeted media content being associated with the content identifier; and send the targeted media content and the content identifier to the mobile device by the media streaming service server over the Internet connection.

12. The computer program product of claim 10, wherein the mobile device is a primary mobile device, wherein prior to the receipt of the given custom information in the RDS signal by the audio system, the one or more processors are further caused to:

collect, by a media streaming service server, global positioning system (GPS) data from a plurality of mobile devices over time;

identify, by the media streaming service server, one or more common patterns in the GPS data that indicate a group of mobile devices traveling with the primary mobile device;

obtain, by the media streaming service server, profiles for the group of mobile devices;

identify, by the media streaming service server, the targeted media content for the group of mobile devices based on the profiles, the targeted media content associated with the content identifier; and send, by the media streaming service server, the targeted media content and the content identifier to the primary mobile device over an Internet connection.

13. The computer program product of claim 12, wherein the one or more processors are further caused to:

determine, by the media streaming service server, that the GPS data does not meet a pre-determined accuracy threshold;

send, by the media streaming service server, a request to the primary mobile device for proximity data;

receive, by the media streaming service server, the proximity data for a list of mobile devices from the primary mobile device; and revise, by the media streaming service server, the group of mobile devices based on the proximity data.

14. The computer program product of claim 13, wherein the one or more processors are further caused to:

in response to receiving the request for the proximity data from the media streaming service server, identify, by the primary mobile device, the list of mobile devices in proximity to the primary mobile device using a Bluetooth proximity discovery process; and send, by the primary mobile device, the proximity data for the list of mobile devices to the media streaming service server.

15. The computer program product of claim 12, wherein in the identifying of the one or more common patterns in the GPS data, the one or more processors are further caused to:

create, by the media streaming service server, a time-based vector for the primary mobile device and each of the plurality of mobile devices;

for each given vector for each given mobile device of the plurality of mobile devices:

compare, by the media streaming service server, the given vector of the given mobile device with a vector of the primary mobile device;

determine, by the media streaming service server, whether the given vector of the given mobile device matches the vector of the primary mobile device in proximity and trajectory;

when the given vector of the given mobile device does not match the vector of the primary mobile device in proximity and trajectory, discard the vector by the media streaming service server; and when the given vector of the given mobile device matches the vector of the primary mobile device in proximity and trajectory, add the given mobile device to the group of mobile devices by the media streaming service server.

16. The computer program product of claim 12, wherein the one or more processors are further caused to:

determine, by the media streaming service server, that the Internet connection with the primary mobile device has fallen below a pre-determined threshold;

search, by the media streaming service server, for an alternate mobile device in the group of mobile devices with an Internet connection above the predetermined threshold; and send, by the media streaming service server, the targeted media content and the content identifier to the alternate mobile device over the Internet connection with the alternate mobile device.

17. The computer program product of claim 16, wherein the one or more processors are further caused to:

receive, by the alternative mobile device, the targeted media content and the content identifier from the media streaming service server; and in response to the alternative mobile device receiving the targeted media content and the content identifier from the media streaming server, establish a connection with the audio system by the alternative mobile device.

18. A system comprising:

an audio system comprising a radio receiver configured to:

receive, by the radio receiver, a radio signal from a radio broadcast system, the radio signal comprising a main signal and a radio data system (RDS) signal, the main signal comprising a plurality of audio programming and one or more pre-determined time slots, the RDS signal comprising one or more custom information corresponding to one or more media content tags, each custom information synchronized with one of the pre-determined time slots in the main signal;

during a playing of the radio signal, process, by the audio system, a given custom information of the one or more custom information in the RDS signal, the given custom information synchronized with a given pre-determined time slot of the one or more pre-determined time slots in the main signal;

in response to processing the given custom information, send, by the audio system to a mobile device connected to the audio system, a request comprising a given media content tag of the one or more media content tags corresponding to the given custom information;

receive, as response to the request, by the audio system from the mobile device, a targeted media content identified by a content identifier based on matching the given media content tag to the content identified at the mobile device, the targeted media content and the content identifier being received by the mobile device prior to the processing of the given custom information by the audio system; and play, by the audio system, the targeted media content, wherein the playing of the targeted media content is synchronized with the given pre-determined time slot in the main signal.

19. The system of claim 18, further comprising a media streaming service server configured to, prior to the receipt of the given custom information in the RDS signal by the audio system:

obtain, by the media streaming service server, a profile of the mobile device over an Internet connection;

identify, by the media streaming service server, the targeted media content based on the profile, the targeted media content being associated with the content identifier; and send, the targeted media content and the content identifier to the mobile device by the media streaming service server over the Internet connection.

20. The system of claim 18, wherein the mobile device is a primary mobile device, wherein a media streaming service server is configured to, prior to the receipt of the given custom information in the RDS signal by the audio system:

collect, by the media streaming service server, global positioning system (GPS) data from a plurality of mobile devices over time;

identify, by the media streaming service server, one or more common patterns in the GPS data that indicate a group of mobile devices traveling with the primary mobile device;

obtain, by the media streaming service server, profiles for the group of mobile devices;

identify, by the media streaming service server, the targeted media content for the group of mobile devices based on the profiles, the targeted media content associated with the content identifier; and send, by the media streaming service server, the targeted media content and the content identifier to the primary mobile device over an Internet connection.

21. The system of claim 20, wherein the media streaming service server is further configured to:

determine, by the media streaming service server, that the GPS data does not meet a pre-determined accuracy threshold;

send, by the media streaming service server, a request to the primary mobile device for proximity data;

receive, by the media streaming service server, the proximity data for a list of mobile devices from the primary mobile device; and revise, by the media streaming service server, the group of mobile devices based on the proximity data.

22. The system of claim 21, wherein the primary mobile device further configured to:

in response to receiving the request for the proximity data from the media streaming service server, identify, by the primary mobile device, the list of mobile devices in proximity to the primary mobile device using a Bluetooth proximity discovery process; and send, by the primary mobile device, the proximity data for the list of mobile devices to the media streaming service server.

23. The system of claim 20, wherein in identifying the one or more common patterns in the GPS data, the media streaming service server is further configured to:

create, by the media streaming service server, a time-based vector for the primary mobile device and each of the plurality of mobile devices;

for each given vector for each given mobile device of the plurality of mobile devices:

compare, by the media streaming service server, the given vector of the given mobile device with a vector of the primary mobile device;

determine, by the media streaming service server, whether the given vector of the given mobile device matches the vector of the primary mobile device in proximity and trajectory;

when the given vector of the given mobile device does not match the vector of the primary mobile device in proximity and trajectory, discard the vector by the media streaming service server; and when the given vector of the given mobile device matches the vector of the primary mobile device in proximity and trajectory, add the given mobile device to the group of mobile devices by the media streaming service server.

24. A method for synchronizing a play of a targeted media content with a time slot in a radio broadcast signal comprising:
- receiving, by a radio receiver of an audio system, a radio signal from a radio broadcast system, the radio signal comprising a main signal and a radio data system (RDS) signal, the main signal comprising a plurality of audio programming and one or more pre-determined time slots, the RDS signal comprising one or more custom information corresponding to one or more media content tags, each custom information synchronized with one of the pre-determined time slots in the main signal;
- prior to receipt of a given custom information of one or more custom information in the RDS signal by the audio system:
  - obtaining, by a media streaming service server, a profile of a mobile device over an Internet connection, the mobile device being connected to the audio system;
  - identifying, by the media streaming service server, the targeted media content based on the profile, the targeted media content being identified by a content identifier;
  - sending the targeted media content and the content identifier to the mobile device by the media streaming service server over the Internet connection;
- during a playing of the radio signal, processing, by the audio system, the given custom information in the RDS signal, the given custom information synchronized with a given pre-determined time slot of the one or more pre-determined time slots in the main signal;
- in response to processing, the given custom information via the RDS signal, sending, by the audio system to the mobile device, a request comprising a given media content tag of the one or more media content tag corresponding to the given custom information;
- receiving as response to the request, by the audio system from the mobile device, the targeted media content corresponding to the content identifier based on matching the given media content tag to the content identifier; and
- playing, by the audio system, the targeted media content, wherein the playing of the targeted media content is synchronized with the given pre-determined time slot in the main signal.

25. A method for synchronizing a play of a targeted media content with a time slot in a radio broadcast signal comprising:
- receiving, by a radio receiver of an audio system, a radio signal from a radio broadcast system, the radio signal comprising a main signal and a radio data system (RDS) signal, the RDS signal comprising one or more custom information associated with one or more media content tags, each custom information synchronized with a pre-determined time slot in the main signal;
- collecting, by a media streaming service server, global positioning system (GPS) data from a plurality of mobile devices over time;
- identifying, by the media streaming service server, one or more common patterns in the GPS data that indicate a group of mobile devices traveling with a primary mobile device connected to the audio system, comprising:
  - creating, by the media streaming service server, a time-based vector for the primary mobile device and each of the plurality of mobile devices;
  - for each given vector for each given mobile device of the plurality of mobile devices:
    - comparing, by the media streaming service server, the given vector of the given mobile device with a vector of the primary mobile device;
    - determining, by the media streaming service server, whether the given vector of the given mobile device matches the vector of the primary mobile device in proximity and trajectory;
    - when the given vector of the given mobile device does not match the vector of the primary mobile device in proximity and trajectory, discarding the vector by the media streaming service server; and
    - when the given vector of the given mobile device matches the vector of the primary mobile device in proximity and trajectory, adding the given mobile device to the group of mobile devices by the media streaming service server;
- obtaining, by the media streaming service server, profiles for the group of mobile devices;
- identifying, by the media streaming service server, the targeted media content for the group of mobile devices based on the profiles, the targeted media content identified by a content identifier;
- sending, by the media streaming service server, the targeted media content and the content identifier to the primary mobile device over an Internet connection;
- during a playing of an audio broadcast in the main signal, receiving, by the audio system, a given custom information in the RDS signal, the given custom information synchronized with a given pre-determined time slot in the main signal;
- in response to the given custom information, sending, by the audio system to the primary mobile device, a request comprising a given media content tag associated with the given custom information;
- receiving as response to the request, by the audio system from the primary mobile device, a targeted media content associated with a content identifier matching the given media content tag; and
- playing, by the audio system, the targeted media content, wherein the playing of the targeted media content is synchronized with the given pre-determined time slot in the main signal.

* * * * *